Patented Dec. 11, 1951

2,578,246

UNITED STATES PATENT OFFICE 2,578,246

1,5-PENTANEDIOL DIFUROATE

Stanford J. Hetzel, Cheltenham, Pa., assignor to Sun Oil Company, Philadelphia, Pa., a corporation of New Jersey No Drawing. Application August 25, 1948,
Serial No. 46,183

2 Claims. (Cl. 260—345)

The present invention relates to a novel compound derived from 1,5-pentanediol

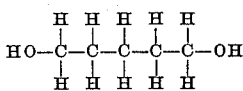

specifically to 1,5-pentanediol difuroate

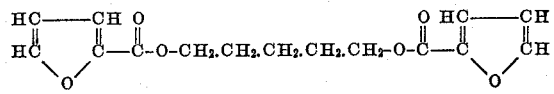

According to the invention the foregoing ester of 1,5-pentanediol was prepared by refluxing in the presence of a trace of para-toluene sulfonic acid approximately stoichiometric quantities of 1,5-pentanediol and furoic acid in presence of a solvent, for example commercially available xylenes.

To suppress the formation of partial ester an excess of the furoic acid should be employed.

Other acid catalysts can be employed. For example sulfuric acid, hydrochloric acid and other acids commonly used in esterification processes can be employed in minor quantities.

Other solvents for example toluene or even higher boiling aromatics can be employed. Solvents inert under the conditions of the reaction also can be used.

The following is an example of the preparation of the ester of this invention:

Example 120 grams furoic acid (1.0 mole) was heated under refluxing conditions with 52 grams 1,5-pentanediol (0.5 mole) and 250 cc. xylene for 8 hours. Two grams para-toluene sulfonic acid was used as a catalyst. Water from the esterification was removed continuously in a Dean-Stark tube. The reaction product was washed with a 20% solution of sodium carbonate and dried over anhydrous calcium chloride. Xylene was removed and the remainder of the reaction mass was distilled taking three cuts as follows:

| | Grams |
|---|---|
| Cut #1—boiling below 240° C./4 mm. Hg (unreacted 1,5-pentanediol and half-ester) | 30 |
| Cut #2—240° C.–260° C./4 mm. Hg (product of the invention) | 112 |
| Cut #3—boiling above 260° C./4 mm. Hg (polymeric material residue) | 8 |

The product of this invention is a colorless to pale amber oil-like material having a boiling point at 4 mm. Hg of about 240° C.–260° C., a refractive index $N_D^{20°\ C.}$ 1.5118, a density $D_4^{20°\ C.}$ 1.189 and a melting point of about 12° C.–15° C.

The ester of this invention has been found useful as a plasticizer for polyvinyl resins such as polyvinyl chloride and polyvinyl chloride-polyvinyl acetate mixtures.

In copending application for Patent Serial No. 46,188, filed by the instant inventor August 25, 1948, now Patent No. 2,504,930, issued Apr. 18, 1950, there is described and claimed a polyvinyl resin in plasticized composition with the ester of this invention.

I claim:
1. 1,5-pentanediol difuroate.
2. An esterification product of 1,5-pentanediol and curoic acid, comprising mainly 1,5-pentanediol difuroate and having a boiling point at 4 mm. Hg of about 240° C.–260° C., a refractive index $N_D^{20°\ C.}$ of about 1.5118, a density $D_4^{20°\ C.}$ of about 1.189, and a melting point of about 12° C.–15° C.

STANFORD J. HETZEL.

REFERENCES CITED

The following references are of record in the file of this patent:

UNITED STATES PATENTS

| Number | Name | Date |
|---|---|---|
| 1,989,701 | Lawson | Feb. 5, 1935 |
| 2,017,070 | Lazier | Oct. 15, 1935 |
| 2,504,930 | Hetzel | Apr. 18, 1950 |

OTHER REFERENCES

Groggins: Unit Processes in Organic Chemistry, 3rd edition, pages 614 and 615, McGraw-Hill Book Co., Inc., New York, 1947.

Beilstein, vol. II, 4th edition, page 144.